Dec. 12, 1961
G. E. MERRYFIELD
PREPARATION AND SEPARATION OF XYLENES
FROM NAPHTHENIC STREAMS
Filed Dec. 12, 1957
3,013,088
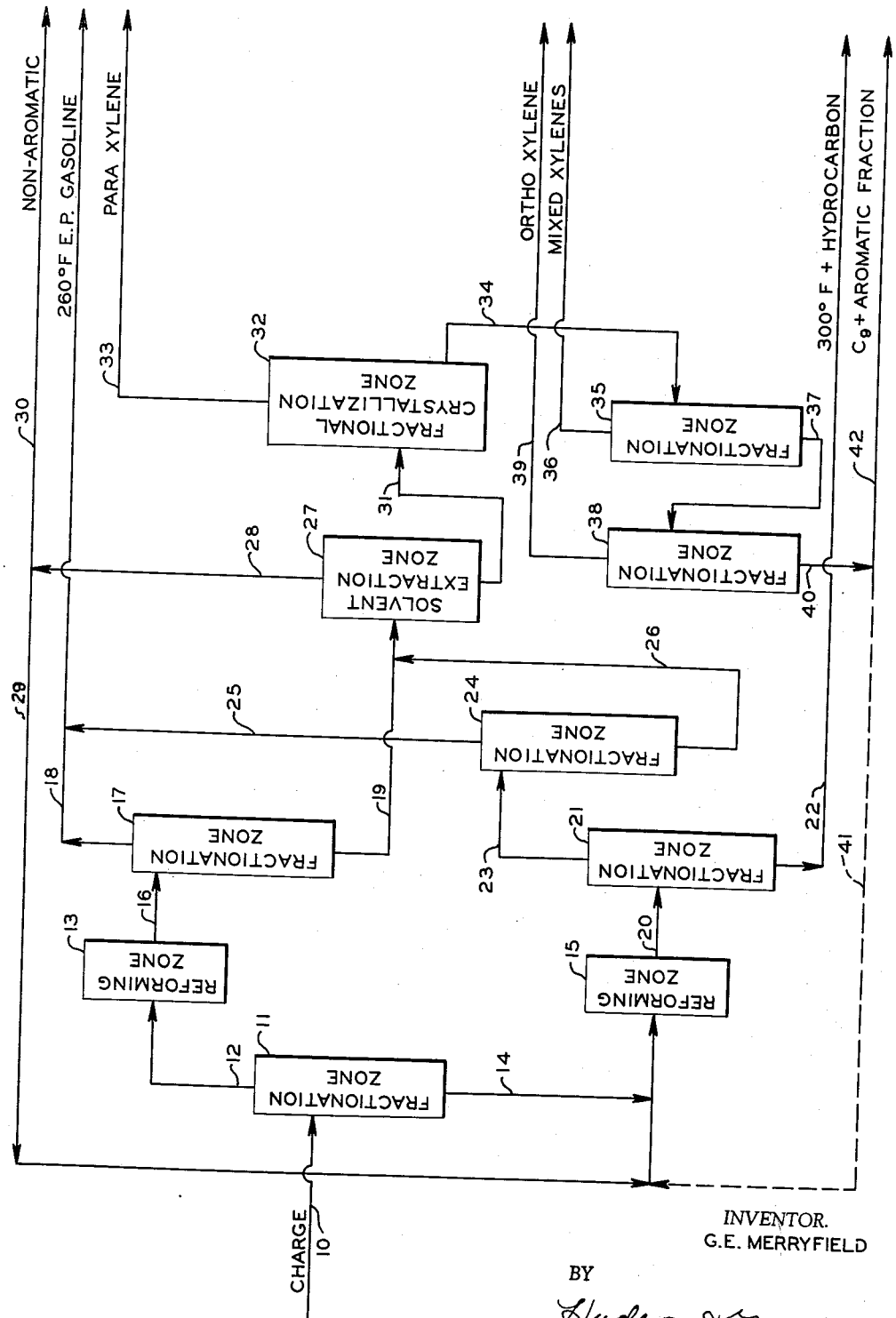
INVENTOR.
G.E. MERRYFIELD
BY
Hudson & Young
ATTORNEYS

United States Patent Office 3,013,088
Patented Dec. 12, 1961

3,013,088
PREPARATION AND SEPARATION OF XYLENES FROM NAPHTHENIC STREAMS
George E. Merryfield, Bartlesville, Okla., assignor to Phillips Petroleum Company, a corporation of Delaware
Filed Dec. 12, 1957, Ser. No. 702,312
5 Claims. (Cl. 260—668)

This invention relates to the production of xylenes. In one of its aspects, this invention relates to an improved process for the production and recovery of xylenes from naphthenic hydrocarbon streams, said process comprising, in combination, the steps of producing xylene compounds from said naphthenic hydrocarbon stream under optimum conditions, removing non-xylene boiling range hydrocarbons from the effluent produced, removing non-aromatic hydrocarbons from the resulting xylene boiling range hydrocarbons, removing and separating para-xylene in a fractional crystallization zone as a product of the process, and removing and separating ortho-xylene, mixed xylenes, and/or a $C_9$ plus aromatic fraction in a fractionation zone as products of the process. In another of its aspects, this invention relates to an improved process for the production and recovery of a xylene concentrate from naphthenic hydrocarbon streams by reforming selected fractions of said naphthenic hydrocarbon streams under particular conditions of operation especially suitable for the production of xylenes and separating and recovering a xylene concentration from the reformates produced. In another of its aspects, this invention relates to an improved process for the separation and recovery of para-xylene, ortho-xylene, a mixed xylene fraction and/or a $C_9$ plus aromatic fraction from a xylene concentrate in a combination process comprising, in sequence, the steps of removing non-aromatic hydrocarbons from said xylene concentrate in a solvent extraction zone, separating and recovering para-xylene in a fractional crystallization zone, separating and recovering a mixed xylene fraction in a first fractionation zone, and separating and recovering ortho-xylene and a $C_9$ plus aromatic fraction in a second fractionation zone.

The ortho-, meta- and para-xylenes, together with ethyl benzene, are important chemicals and find wide and varied application in industry. Although some of these isomers are interchangeable in particular applications, in most cases, one or another of the four isomers is superior to the others or to mixtures of the other isomers so that each of the four isomers is in demand in substantially pure form. Unfortunately, these hydrocarbons are nearly always obtained as mixtures of these four isomers.

The separation and recovery of these four isomers from the mixtures in which they are obtained is not simple because the boiling point of each of these isomers is very close to the boiling point of the other isomers. Also, the presence of paraffins and aromatics isomeric to the xylenes, particularly of ethyl benzene, complicate and make the purification problem difficult. For example, the presence of aliphatic hydrocarbon impurities in a xylene fraction makes the separation of para-xylene from its isomers by a crystallization process very difficult. Therefore, the scource of the xylene fraction, as reflected by the hydrocarbon impurities present, is an important consideration in commercial processes for the separation of the specific xylenes from each other.

A very suitable xylene fraction is obtained by aromatization, such as in a reforming process, wherein a naphthenic hydrocarbon fraction is aromatized and xylenes are produced. However, since the chemistry involved in these processes is very complex and the mixtures obtained are extremely complex, a preferred xylene fraction for separation and recovery of the specific xylene is not always obtained.

An object of this invention is to provide a process for the production of xylene compounds from naphthenic hydrocarbon streams in an improved and economical manner by producing xylene compounds from said naphthenic hydrocarbon streams under optimum conditions of reaction, removing non-xylene boiling range hydrocarbons from the effluent produced in a fractionation step, removing non-aromatic hydrocarbons from the resulting xylene boiling range hydrocarbons in a solvent extraction step, removing para-xylene in a fractional crystallization step, and removing a mixed xylene fraction, ortho-xylene and/or a $C_9$ plus aromatic fraction in subsequent fractionation steps.

Another object of this invention is to provide an improved process for the production of a xylene concentrate in higher yields from a naphthenic hydrocarbon stream by first separating said naphthenic hydrocarbon stream into higher and lower boiling range fractions and then reforming each fraction separately under optimum conditions for the production of xylenes and, finally, separating and removing non-xylene boiling range material from the reformates produced.

Another object of this invention is to provide an improved process for the separation and recovery of para-xylene, ortho-xylene and/or a mixed xylene fraction from a xylene concentrate by separating non-aromatic hydrocarbons from said xylene concentrate in a solvent extraction zone, separating para-xylene in a fractional crystallization zone, and separating said mixed xylene fraction and/or said ortho-xylene in a fractionation zone.

Other aspects, objects and advantages of the invention are apparent from a consideration of the accompanying disclosure, drawing and the appended claims.

In accordance with this invention, there is provided a process for the production and recovery of xylenes from a naphthenic stream, said process comprising, in combination, reforming selected fractions of said naphthenic stream under optimum conditions for the production of xylenes, removing non-xylene boiling range hydrocarbons from the reformates produced by fractionation, removing non-aromatic hydrocarbons from the resulting xylene boiling range hydrocarbons by solvent extraction, removing para-xylenes from the resulting solvent extracted xylene boiling range fraction by fractional crystallization, and removing a mixed xylene fraction, ortho-xylene and/or a $C_9$ plus aromatic fraction by fractionation. Thus, the combined steps of the integrated process of this invention accomplish the formation of xylenes and, thereafter, the separation of said xylenes produced, as well as the separation of those xylenes originally in the feed stream, in an improved and economical manner.

Also, in accordance with this invention, there is provided a process for the production of a xylene concentrate from a naphthenic stream, said process comprising, in combination, fractionating said naphthenic stream into low and high boiling range fractions, reforming each of said low and high boiling range fractions separately under optimum conditions for the formation of xylenes, and separating non-xylene boiling range hydrocarbons from the reformates produced.

Further, in accordance with this invention, there is provided a process for the separation of para-xylene, ortho-xylene, a mixed xylene fraction, and/or a $C_9$ plus aromatic fraction from a xylene concentrate, said process comprising, in combination, removing non-aromatic hydrocarbons from said xylene concentrate by solvent extraction, removing para-xylene from the resulting aromatic fraction by fractional crystallization, and removing a mixed xylene fraction, ortho-xylene and/or a $C_9$ plus aromatic fraction by fractionation.

A particular feature of the improved process of this invention is that the reforming step is carried out in a manner for the maximum production of xylenes with minimum production of interfering hydrocarbon impurities by first separating the naphthenic feed stream into low and high boiling fractions and then reforming each fraction separately under optimum conditions. Since dehydrogenation is the principal reaction occurring in a reforming zone wherein predominantly lower boiling fractions are being reformed, and since lower boiling fractions are more refractory than higher boiling fractions, higher temperatures and lower pressures are employed in order to satisfactorily reform the lower boiling fractions. However, if higher boiling fractions (less refractory) are also admixed with the lower boiling fractions in a reforming zone, at the higher temperature and lower pressure operation, a considerable amount of carbon or coke is produced on the catalyst at the expense of the desired xylene formation. Since dehydrogenation and cyclization are the principal reactions occurring in a reforming zone wherein predominantly higher boiling fractions are being reformed, and since the higher boiling fractions are less refractory than the lower boiling fractions, lower temperatures and higher pressures must be employed in order to satisfactorily reform the higher boiling fractions. Accordingly, in the process of this invention, the reforming of the higher boiling range fraction is carried out under milder reaction conditions than are employed in reforming the lower boiling range fraction.

Another feature of the improved process of this invention is that the reformate from each reforming zone is subjected to fractionation in order to obtain a xylene boiling range fraction for treatment in the subsequent xylene separation steps. Thus, the volume of reformate to be treated in the xylene purification steps is reduced to that portion containing the xylene isomers. This manner of operation permits substantial saving in the cost of equipment required in the xylene separation steps since a smaller volume of hydrocarbon is treated. Furthermore, the removal of non-xylene type hydrocarbons at this stage in the process substantially reduces the interference of these hydrocarbons in the subsequent xylene separation steps.

Another feature of the improved process of this invention is that the combined concentrated xylene fraction recovered from the reforming zones is subjected to solvent extraction in order to further concentrate the xylene fraction and remove interfering hydrocarbons. In the solvent extraction step, an aromatic fraction is separated from the other hydrocarbons in the reformate for subsequent treatment to separate and recover the xylene isomers contained therein.

Another feature of the improved process of this invention is that the non-aromatic fraction obtained in the solvent extraction step is recycled to the reforming zone in which the higher boiling fraction of the feed is reformed to produce xylenes. Also, a portion of the bottom fraction obtained in the final ortho-xylene fractionation step is recycled to this same reforming zone. In this manner of operation, the yield of xylene compounds per unit volume of feed is increased.

Understanding of this invention will be obtained upon reference to the drawing, which is a schematic flow diagram used in the process of this invention.

Referring to the drawing, a naphthenic stock boiling in the range of 180° F. to 400° F. is fed through line 10 to fractionator 11 wherein separation of the feed stock into higher boiling and lower boiling fractions is effected. The lower boiling fraction, boiling in the temperature range of 180° F. to 270° F. is removed from fractionator 11 through line 12 and passed into reforming zone 13 operated at optimum conditions for the production of xylenes. Similarly, the higher boiling fraction, boiling in the temperature range of 270° F. to 400° F., is removed from the bottom of fractionator 11 through line 14 and passed into reforming zone 15 which is operated under optimum conditions for the production of xylenes. For simplicity, the various furnaces, reactors, separators and recycle lines involved in a reforming process are not shown in the drawing but are merely indicated as reforming zones 13 and 15.

The product removed from reforming zone 13 is passed through line 16 into fractionator 17. This product contains xylene compounds formed in the reforming zone, as well as non-xylene compounds. In fractionator 17, separation of this product stream is effected to produce an overhead fraction boiling below 260° F. and a bottoms fraction boiling above 260° F. The overhead is removed from fractionator 17 through line 18 and is recovered as 260° F. end point gasoline. The bottoms fraction is removed through line 19 and contains a substantial amount of xylenes.

The product stream recovered from reforming zone 15 contains xylene compounds formed in the reforming zone, as well as the naturally occurring xylenes found in the original feed. This product stream is removed from reforming zone 15 through line 20 and passed into fractionator 21 from which a bottoms stream boiling above 300° F. is removed through line 22. The overhead fraction formed in fractionator 21 is removed through line 23 and passed into fractionator 24. The overhead fraction formed in fractionator 24 boils below 260° F. and is removed from fractionator 24 through line 25. This overhead fraction can also be recovered as 260° F. end point gasoline, as was the overhead fraction recovered from fractionator 17. The bottoms fraction recovered from fractionator 24 boils in the temperature range of 260° F.–300° F. and is removed through line 26. This bottoms fraction contains a substantial proportion of xylene compounds, together with minor proportions of paraffinic and naphthenic compounds. Of course, the sequence of fractionation, fractionator 21 and fractionator 24, can be reversed.

The bottoms fractions recovered from fractionators 17 and 24 through lines 19 and 26, respectively, are combined and are passed into solvent extraction zone 27. Solvent extraction zone 27 comprises the conventional solvent extraction known in the art for separating aromatics from non-aromatics. Again, for simplicity, solvent extraction zone 27 is indicated generally in the drawing without specific details of this zone being shown. The non-aromatic fraction produced in solvent extraction zone 27 is removed through line 28 and recycled to reforming zone 15 through lines 29 and 14. If desired, a portion of this non-aromatic fraction can be withdrawn from the process through line 30. The aromatic fraction formed in solvent extraction zone 27 contains the xylene compounds substantially free from non-aromatic hydrocarbons, such as paraffins, which interfere in the separation of the xylene isomers. This aromatic fraction is removed from solvent extraction zone 27 through line 31 and passed into fractional crystallization zone 32.

Fractional crystallization zone 32 is the conventional fractional crystallization process known in the art wherein a xylene-rich fraction is subjected to a temperature in the range of −70° F. to −115° F. in order to effect separation of pure para-xylene from the other xylene isomers as either a melt or as a predominantly crystalline material or slurry. Again, for simplicity, crystallization zone 32 is indicated in a general manner. One particular form of crystallization process for the separation of para-xylene is disclosed in the patents of Schmidt 2,617,274 and Arnold 2,540,977. Pure para-xylene is removed from crystallization zone 32 through line 33 as product of the process. The mother liquor containing meta- and ortho-xylenes, as well as minor amounts of para-xylene and ethyl benzene, is removed from crystallization zone 32 through line 34 and supplied to fractionator 35.

In fractionation zone 35, a mixed xylene fraction is recovered overhead and withdrawn from fractionation zone 35 through line 36. This mixed xylene fraction comprises primarily meta-xylene with minor amounts of ortho- and para-xylenes and ethyl benzene. The bottoms fraction formed in fractionation zone 35 comprises ortho-xylene with minor amounts of $C_9$ hydrocarbons and aromatics. This bottoms fraction is passed through line 37 into fractionation zone 38 wherein pure ortho-xylene is separated as an overhead fraction and withdrawn through line 39. The bottoms fraction formed in fractionation zone 38 is withdrawn through line 40 and in some operations may be recycled through lines 41 and 14 into reforming zone 15. If desired, a portion of the bottoms fraction can be withdrawn from the process through line 42.

The hydrocarbon stocks that may be converted in accordance with the process of this invention comprise any aromatizable hydrocarbons or distillates which, preferably, contain naphthenes. A preferred stock is petroleum naphtha, which may be either a virgin or cracked naphtha or mixtures of both. Preferably, the hydrocarbon stock should be rich in dimethylcyclohexanes and other $C_8$ hydrocarbons with minor amounts of cycloaliphatic hydrocarbons, paraffins and aromatics also present. The hydrocarbon stocks should fall within the boiling range of from about 180° F. to about 400° F.

Processes and catalysts for effecting aromatization reactions are known in the art. These various known processes and catalysts may be utilized within the broader aspects of this invention. Particular types of processes which may be utilized in this invention are reforming, hydroforming, and platforming. These processes may be carried out at a temperature in the range of 700° F. to 1000° F., preferably, 800° F. to 950° F.; a pressure within the range of atmospheric to 1000 p.s.i.g., preferably, 200–600 p.s.i.g.; a liquid hourly space velocity of 0.3–10, preferably, 0.5–6; and a hydrogen to hydrocarbon mol ratio of between 0.5:1 to 20:1, preferably, 1:1 to 10:1. The particular conditions employed in each of the reforming zones 13 and 15 are selected within these general process conditions so as to obtain optimum conversion conditions in each zone for the formation of xylene compounds. Thus, in reforming zone 13, wherein the lower boiling naphthenic fraction is reformed, a pressure of 350 p.s.i.g. and a hydrogen to hydrocarbon mol ratio of 6:1 is preferred for the formation of xylenes; whereas, in reforming zone 15, wherein the higher boiling naphthenic fraction is reformed, a pressure of 500 p.s.i.g. and a hydrogen to hydrocarbon mol ratio of 8:1 is preferred.

The catalyst employed in the reforming steps of this invention preferably comprise a hydrogen fluoride treated alumina catalyst impregnated with between 0.1 and 5 weight percent platinum, preferably, 0.1 to 1 weight percent platinum. Other conventional aromatizing type catalysts, such as platinum supported on silica-alumina, palladium supported on either alumina or silica-alumina, either of which may be treated with a halogen, such as hydrogen fluoride, can be utilized in the reforming step. Other catalysts which can also be utilized are molybdenum oxide, cobalt oxide, either separately or as a mixture, supported on alumina or silica-alumina.

Solvent extraction zone 27 can be any solvent extraction process wherein separation of a hydrocarbon stream into aromatic and non-aromatic fractions is accomplished by contacting the hydrocarbon stream with a selective solvent. Processes for effecting such separations are well known in the art. Selective solvents which can be used include sulfur dioxide, diethylene glycol (with or without water), acetonitrile, dimethyl sulfoxide, furfural, phenol, and the like. Preferably, the selective solvent is liquid sulfur dioxide.

Processes for effecting the separation of para-xylene from its isomers by fractional crystallization are well known in the art, for example, as disclosed in the patents by Schmidt 2,617,274 and Arnold 2,540,977. Ordinarily, the crystallization temperature will be between −70° F. and −115° F., depending upon the composition of the feed and the desired approach to the eutectic temperature. Preferably, the crystallization process will be carried out under such conditions that the crystals are continuously washed by an internal reflux and relatively pure para-xylene. However, the crystallization separation can be carried out in a step-wise process, in which case the occluded mother liquor is washed from the crystals by any of several liquid streams, such as an intermediate fraction or pure product. The pure para-xylene product can be recovered from the crystallization zone either as a melt or as a predominantly crystalline material or slurry.

*Specific example*

Naphthenic charge stock (10):
    Barrels per day _____ 32,000
    API gravity, 60° F./60° F. _____ 53.7
    Composition, vol. percent:
        Paraffins _____ 47.5
        Naphthenics _____ 38.8
        Aromatics _____ 13.7
    Boiling range, ° F. _____ 180–400
Lower boiling fraction (12):
    Barrels per day _____ 16,000
    API gravity, 60° F./60° F. _____ 58.8
    Boiling range, ° F. _____ 180–270
Higher boiling fraction (14):
    Barrels per day _____ 16,000
    API gravity, 60° F./60° F. _____ 48.9
    Boiling range, ° F. _____ 270–400
Stabilized reformed light product (18):
    Barrels per day _____ 11,200
    API gravity, 60° F./60° F. _____ 60.2
    Boiling range, ° F. _____ 120–260
    Research octane No., 3 cc. TEL _____ 93
Stabilized reformed heavy product (19):
    Barrels per day _____ 2,400
    API gravity, 60° F./60° F. _____ 37.8
    Boiling range, ° F. _____ 260–320
    Research octane No., 3 cc. TEL _____ 105
Reformed light product (25):
    Barrels per day _____ 5,240
    API gravity, 60° F./60° F. _____ 59.5
    Boiling range, ° F. _____ 120–260
    Research octane No., 3 cc. TEL _____ 93
Reformed heavy product (22):
    Barrels per day _____ 5,500
    API gravity, 60° F./60° F. _____ 32.0
    Boiling range, ° F. _____ 300–420
    Research octane No., 3 cc. TEL _____ 100
Reformed intermediate product (26):
    Barrels per day _____ 2,860
    API gravity, 60° F./60° F. _____ 42.0
    Boiling range, ° F. _____ 260–300
Raffinate yield (28):
    Barrels per day _____ 1,645
    API gravity, 60° F./60° F. _____ 64.8
    Boiling range, ° F. _____ 260–300
    Research octane No., 3 cc. TEL _____ 80
Extract yield (31):
    Barrels per day _____ 3,615
    API gravity, 60° F./60° F. _____ 31.3
    Boiling range, ° F. _____ 275–320
Para-xylene yield (33): Barrels per day _____ 440
Ortho-xylene yield (39): Barrels per day _____ 735
Mixed xylene yield (36):
    Barrels per day _____ 2,220
    Research octane No., 3 cc. TEL _____ 110
Heavy aromatics yield (42):
    Barrels per day _____ 180
    Research octane No., 3 cc. TEL _____ 110
Reactor:
    Pressure, p.s.i.g. _____ 350
    Temperature, ° F. _____ 930
    Liquid hourly space velocity _____ 3
    $H_2$/hydrocarbon mol ratio _____ 5:1

Reactor (15):
- Pressure, p.s.i.g. ............................ 500
- Temperature, °F ............................. 910
- Liquid hourly space velocity .............. 3
- H₂/hydrocarbon mol ratio .................. 8:1

Reasonable variation and modification are possible within the scope of the foregoing disclosure, drawing and the appended claims to the invention, the essence of which is that there have been provided an integrated combined process for the preparation and separation of xylene compounds from naphthenic streams in an improved manner, said process comprising reforming specific boiling range fractions of said naphthenic streams separately under optimum conditions for the formation of xylene compounds, separating non-xylene boiling range hydrocarbons from the reformate produced, separating non-aromatic hydrocarbons from the resulting xylene concentrate, separating para-xylene by fractional crystallization, separating ortho-xylene by fractionation to form an ortho-xylene product and a mixed xylene product, and recycling non-paraffinic and non-xylene type hydrocarbons to a reforming zone.

I claim:

1. A process comprising separately reforming selected lower and higher boiling range fractions of a naphthenic stream under optimum xylene forming conditions, said lower boiling range fraction boiling in the range of about 180° F. to 270° F., said higher boiling range fraction boiling in the range of about 270° F. to 400° F. and being reformed under relatively milder reaction conditions than are employed in reforming said lower boiling range fraction, said optimum conditions comprising temperatures in the range of about 700° F. to 1000° F., pressures in the range of atmospheric to 1000 p.s.i.g., liquid hourly space velocities in the range of about 0.3 to 10, and hydrogen to hydrocarbon mol ratios in the range of about 0.5:1 to 20:1, and fractionating the resulting reformates to concentrate the xylenes formed.

2. A process comprising separately catalytically reforming selected lower and higher boiling range fractions of a naphthenic stream under optimum xylene-forming conditions, said naphthenic stream selected from the group consisting of virgin and cracked naphthas, said lower boiling range fraction boiling in the range of about 180° F. to 270° F., said higher boiling range fraction boiling in the range of about 270° F. to 400° F. and being reformed under relatively milder reaction conditions comprising higher pressures than are employed in reforming said lower boiling range fraction, said optimum conditions comprising temperatures in the range of about 700° F. to 1000° F., pressures in the range of atmospheric to 1000 p.s.i.g., liquid hourly space velocities in the range of about 0.3 to 10, and hydrogen to hydrocarbon mol ratios in the range of about 0.5:1 to 20:1, and fractionating the resulting reformates to concentrate the xylenes formed.

3. A process according to claim 2 wherein said naphthenic stream is a cracked naphtha, said reforming steps are carried out in the presence of a catalyst comprising platinum supported on alumina and activated with a halogen, said temperatures are in the range of about 800° F. to 950° F., the reaction pressure in reforming said lower boiling range fraction is about 350 p.s.i.g., and the reaction pressure in reforming said higher boiling range fraction is about 500 p.s.i.g.

4. A process comprising separately reforming selected lower and higher boiling range fractions of a naphthenic stream under optimum xylene-forming conditions, said lower boiling range fraction boiling in the range of about 180° F. to 270° F., said higher boiling range fraction boiling in the range of about 270° F. to 400° F. and being reformed under relatively milder reaction conditions comprising higher pressures than are employed in reforming said lower boiling range fraction, said optimum conditions comprising temperatures in the range of about 700° F. to 1000° F., pressures in the range of atmospheric to 1000 p.s.i.g., liquid hourly space velocities in the range of about 0.3 to 10, and hydrogen to hydrocarbon mol ratios in the range of about 0.5:1 to 10:1, combining the resulting xylene concentrates into a combined xylene boiling range fraction, separating the combined xylene boiling range fraction into an aromatic fraction and a non-aromatic fraction by solvent extraction, and separating para-xylene from the resulting aromatic fraction by fractional crystallization.

5. A process comprising separately reforming selected lower and higher boiling range fractions of a naphthenic stream under optimum xylene-forming conditions, said lower boiling range fraction boiling in the range of about 180° F. to 270° F., said higher boiling range fraction boiling in the range of about 270° F. to 400° F. and being reformed under relatively milder reaction conditions comprising higher pressures than are employed in reforming said lower boiling range fraction, said optimum conditions comprising temperatures in the range of about 700° F. to 1000° F., pressures in the range of atmospheric to 1000 p.s.i.g., liquid hourly space velocities in the range of about 0.3 to 10, and hydrogen to hydrocarbon mol ratios in the range of about 0.5:1 to 20:1, fractionating the resulting reformates to concentrate the xylenes formed and separating therefrom gasoline boiling range fractions, combining the resulting xylene concentrate fractions to form a single xylene fraction, contacting said single xylene fraction with a selective solvent under solvent extraction conditions to form a non-aromatic fraction and an aromatic fraction, returning said non-aromatic fraction to that reforming operation in which said higher boiling range fraction is reformed, separating para-xylene from said aromatic fraction by fractional crystallization and recovering said para-xylene as a product of the process, fractionating the resulting uncrystallized material to form a mixed xylene fraction and a bottoms fraction, fractionating said bottoms fraction to form ortho-xylene and a heavy aromatic fraction, returning said heavy aromatic fraction to that reforming operation in which said higher boiling range fraction is reformed, and recovering said mixed xylene fraction and said ortho-xylene as products of the process.

References Cited in the file of this patent

UNITED STATES PATENTS

| | | |
|---|---|---|
| 2,304,183 | Layng et al. | Dec. 8, 1942 |
| 2,533,232 | Dressler | Dec. 12, 1950 |
| 2,653,175 | Davis | Sept. 22, 1953 |
| 2,727,077 | Fragen et al. | Dec. 13, 1955 |
| 2,890,252 | Cottle | June 9, 1959 |